United States Defensive Publication [19] (H) [11] T105,604

Uy [43] Jul. 2, 1985

[54] INTRACTABLE POLY(P-PHENYLENEBENZOBIS-THIAZOLE) FIBER

[76] Inventor: William C. Uy, 9 Queens Ct., Wilmington, Del. 19808

[21] Appl. No.: 611,932

[22] Filed: May 21, 1984

Related U.S. Application Data

[63] Continuation of Ser. No. 412,168, Aug. 27, 1982, abandoned.

[51] Int. Cl.[3] ..... D02G 3/00

[52] U.S. Cl. ..... 428/364; 528/337

[57] ABSTRACT

Poly(p-phenylenebenzobisthiazole) (PBT) fiber which is at least partially insoluble in methanesulfonic acid at room temperature. The fiber is prepared by heat treatment of PBT fiber, for a time sufficient to make it at least partially insoluble in methanesulfonic acid, at temperatures of 550° C. (e.g., for 600 seconds) to 780° C. (e.g., for 18 seconds).

2 Claims, No Sheets Drawing,

12 Pages Specification

The file of this unexamined application may be inspected and copies thereof may be purchased (849 O.G. 1221, Apr. 9, 1968).